United States Patent [19]

Kurita

[11] Patent Number: 4,664,797
[45] Date of Patent: May 12, 1987

[54] FILTER CLOTH HANGING APPARATUS FOR FILTER PASS

[75] Inventor: Tetsuya Kurita, Takarazuka, Japan

[73] Assignee: Kurita Machinery Manufacturing Company Limited, Osaka, Japan

[21] Appl. No.: 770,186

[22] Filed: Aug. 28, 1985

[30] Foreign Application Priority Data

Sep. 7, 1984 [JP] Japan .................... 59-136497[U]

[51] Int. Cl.⁴ .......................................... B01D 25/32
[52] U.S. Cl. .................... 210/225; 100/198;
100/199; 210/230; 210/227
[58] Field of Search .............. 100/194, 196–200;
210/224–231

[56] References Cited

U.S. PATENT DOCUMENTS

| | | | |
|---|---|---|---|
| 2,845,181 | 7/1958 | Rathe et al. | 210/224 X |
| 3,366,244 | 1/1968 | Kurita | 210/225 |
| 3,962,090 | 6/1976 | Langer | 210/231 |

FOREIGN PATENT DOCUMENTS

| | | | |
|---|---|---|---|
| 46-29420 | 8/1971 | Japan | 210/225 |
| 59-39312 | 3/1984 | Japan | 210/225 |
| 114308 | 6/1985 | Japan | 210/225 |
| 2133305 | 7/1984 | United Kingdom . | |

Primary Examiner—Richard V. Fisher
Assistant Examiner—W. Gary Jones
Attorney, Agent, or Firm—Wenderoth, Lind & Ponack

[57] ABSTRACT

A filter cloth hanging apparatus for a filter press, including a set of first and second support arms attached pivotally to each side face of each of filter plates, a spring attached to each of the first and second support arms, a set of first and second horizontal rods extending between opposite side faces of each of the filter plates through the springs, and a filter cloth attached, at its opposite ends, to the first and second horizontal rods and brought into contact, at its central portion, with a bottom face of each of the filter plates such that the first and second support arms are pivotally coupled with each other between each pair of adjacent ones of the filter plates.

3 Claims, 6 Drawing Figures

Fig. 4
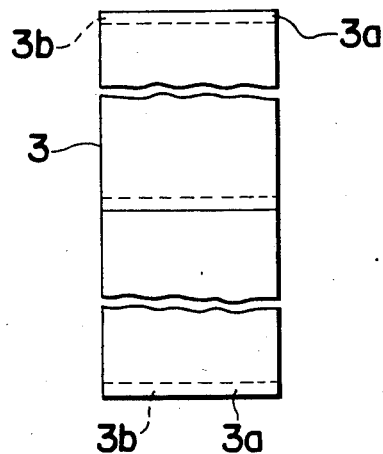
Fig. 5 Fig. 6
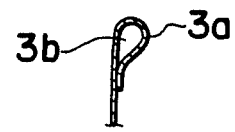 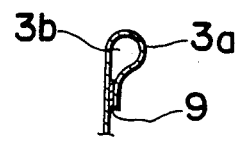
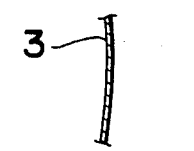 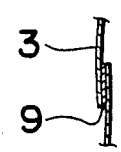
 

FILTER CLOTH HANGING APPARATUS FOR FILTER PASS

BACKGROUND OF THE INVENTION

The present invention generally relates to a filter press and more particularly, to a filter cloth hanging apparatus for the filter press.

As shown in FIG. 1, in a prior art filter cloth hanging apparatus for a filter press disclosed in, for example, U.S. Pat. No. 3,366,244, two links 33 each constituted by a pair of support arms 32 are provided at opposite sides of a pair of adjacent filter plates 31, respectively. Namely, each pair of the support arms 32 are pivotally attached, at lower ends thereof, to side faces on each side of the pair of the adjacent filter plates 31, respectively and are pivotally coupled, at upper ends thereof, with each other by a pin 34. A spring 35 is attached to the pin 34. A horizontal rod 36 is suspended, between each pair of the support arms 32, from a pair of the springs 35 so as to extend between the pair of the springs 35. Each of the support arms 32 is formed, at a proper position thereof, with a projection 32a such that a pair of auxiliary horizontal rods 37 are extended between the projections 32a of one pair of the support arms 32 disposed on one side of the adjacent filter plates 31 and the corresponding projections 32a of the other pair of the support arms 32 disposed on the other side of the adjacent filter plats 31, respectively. A filter cloth 38 is attached, at opposite ends thereof, to lower edges of the adjacent filter plates 31. The cloth is hung, at a central portion thereof, on the horizontal rod 36 so as to extend, at its two halfway portions between the central portion and the opposite ends of the filter cloth 38, over the auxiliary horizontal rods 37. A pair of side plates 39 are, respectively, provided at the opposite sides of the filter plates 31. Meanwhile, a pair of lugs 31a are, respectively, provided on opposite side faces of each of the filter plates 31 so as to be slidably placed on the side plates 39 such that the filter plates 31 are slid, via the lugs 31a, on the side plates 39.

Thus, in the known filter cloth hanging apparatus, the filter cloth 38 is attached, at the opposite ends, to the lower edges of the adjacent filter plates 31 and is hung, at the central portion, on the horizontal rod 36 so as to extend, at its two halfway portions between the central portion and the opposite ends of the filter cloth 38, over the auxiliary horizontal rods 37 as described above. Accordingly, when the filter plates 31 are retracted away from each other and the horizontal rod 36 is vibrated by a filter cloth vibrator in order to separate filer residue adhering to the filter cloth 38 the vibrations applied from a head of the filter cloth vibrator to the horizontal rod 36 are damped by the auxiliary horizontal rods 37. Therefore, the vibrations are not transmitted to the filter cloth 38 as they are and a problem arises in that it is impossible to sufficiently vibrate the filter cloth 38 as a whole.

Furthermore, in the prior art filter cloth hanging apparatus, since the filter cloth 38 is strained so as to cover an upper space between the adjacent filter plates 31 when the filter plates 31 are retracted away from each other, a washing nozzle of a filter cloth washing device cannot be angularly provided from above the filter plates 31. Thus, the filter cloth washing device is required to be provided at one side of or downwardly of the filter plates 31, thereby necessitating a larger filter press which is undesirable.

Moreover, in the known filter cloth hanging apparatus, the filter cloth 38 is required to be attached, at the opposite ends, to the lower edge of the adjacent filter plates 31 and hung on the horizontal rod 36 so as to extend over the auxiliary horizontal rods 37. This results in a troublesome and time-consuming filter cloth fitting operation.

SUMMARY OF THE INVENTION

Accordingly, an essentially object of the present invention is to provide a filter cloth hanging apparatus for a filter press, in which vibrations of a filter cloth vibrator are transmitted to filter cloths as they are so as to efficiently separate from the filter cloths filter residue adhering thereto, with substantial elimination of the disadvantages inherent in conventional filter cloth hanging apparatuses of this kind.

Another important object of the present invention is to provide a filter cloth hanging apparatus of the above described type in which a sufficient clearance can be secured between confronting filter cloths disposed between a pair of adjacent filter plates. Therefore, a large upper space can be obtained between the confronting filter cloths when the filter plates are retracted away from each other. A washing nozzle of a filter cloth washing device can thus be provided from above the filter plates, thereby allowing the filter press compact in size.

Still another object of the present invention is to provide a filter cloth hanging apparatus of the above described type in which a filter cloth fitting operation can be performed easily.

In order to accomplish these objects of the present invention, a filter cloth hanging apparatus embodying the present invention for a filter press including a plurality of filter plates, comprises: a set of first and second support arms which are pivotally attached to each side face of each of said filter plates such that each pair of adjacent ones of said filter plates are provided, on each side face thereof, with a first set of said first and second support arms and a second set of said first and second support arms, respectively. The first support arm of said first set of said first and second support arms and said second support arm of said second set of said first and second support arms are pivotally coupled, at distal ends thereof, with each other. A spring is attached to each of said first and second support arms. A set of first and second horizontal rods are provided. The first horizontal rod being hung from and extends between said spring attached to said first support arm provided on one side face of each of said filter plates and said spring attached to said first support arm provided on the other side face of each of said filter plates. The second horizontal rod is hung from and extends between said spring attached to said second support arm provided on one side face of each of said filter plates and said spring attached to said second support arm provided on the other side face of each of said filter plates. A filter cloth is attached, at opposite ends thereof, to said set of said first and second horizontal rods and is fitted around a bottom face of each of said filter plates so as to extend along opposite filtration faces of each of said filter plates. Accordingly, said filter cloth is brought into contact, at its central portion between said opposite ends of said filter cloth, with said bottom face of each of said filter plates.

BRIEF DESCRIPTION OF THE DRAWINGS

These objects and features of the present invention will become apparent from the following description taken in conjunction with the preferred embodiment thereof with reference to the accompanying drawings, in which:

FIG. 4 is a top plan view of a filter cloth employed in the filter cloth hanging apparatus of FIG. 2;

FIG. 5 is an enlarged sectional view of the filter cloth of FIG. 4; and

FIG. 6 is a view similiar to FIG. 5, particularly showing a modification thereof.

Before the description of the present invention proceeds, it is to be noted that like parts are designated by like reference numerals throughout several views of the accompanying drawings.

DETAILED DESCRIPTION OF THE INVENTION

Figure 1:
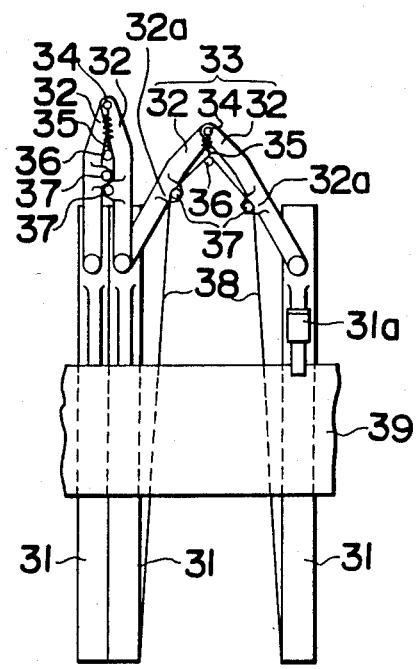
FIG. 1 is a side elevational view of a prior art filter cloth hanging apparatus (already referred to)
Figure 2:
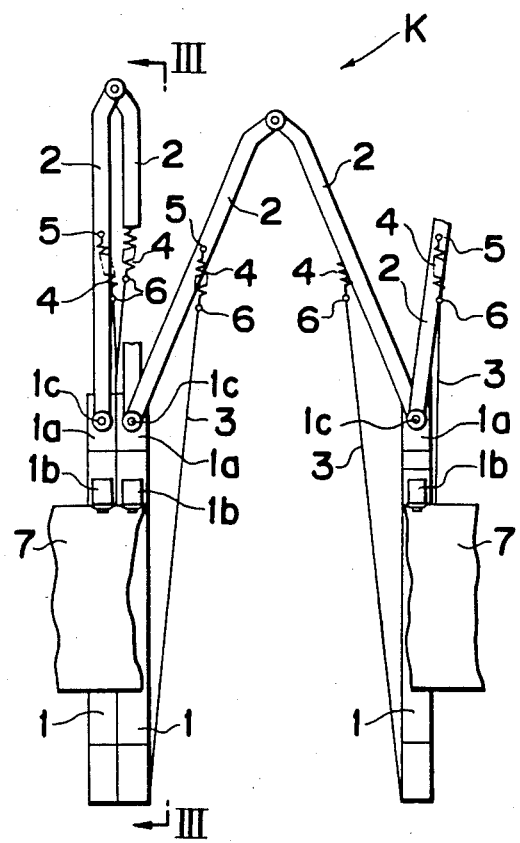
FIG. 2 is a side elevational view of a filter cloth hanging apparatus according to the present invention.
Figure 3:
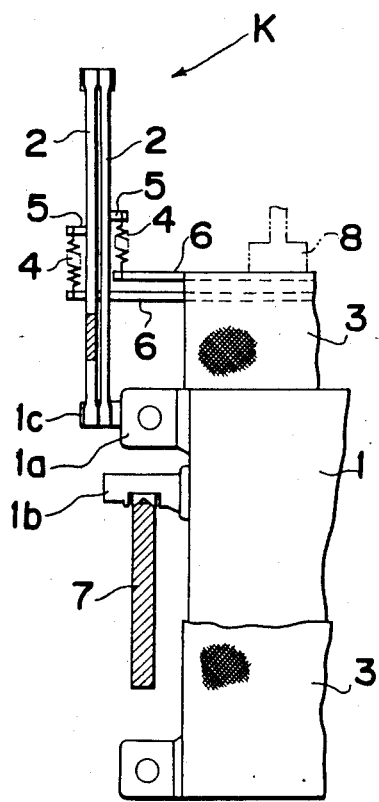
FIG. 3 is a view as observed in the direction of the arrows III—III in FIG. 2.

Referring now to the drawings, there is shown in FIGS. 2 and 3, a filter cloth hanging apparatus K for a filter press, according to the present invention. The filter press includes a pair of side plates 7 mounted on and extending between front and rear frames (not shown). A plurality of filter plates 1 are provided to be slidable between the side plates 7. Each of the filter plates 1 is formed, at an upper portion 1a disposed on each side face thereof, with a slurry hole (not shown). A pair of support arms 2 are coaxially and pivotally mounted on a pin 1c secured to the upper portion 1a so as to overlay each other. Between a pair of adjacent filter plates 1, a pair of the support arms 2 are pivotally coupled, at distal ends thereof with each other, upwardly of each side face of the adjacent filter plates 1 so as to constitute a link.

An arm pin 5 is secured to a proper position of each of the support arms 2 and a coiled spring 4 is attached to the arm pin 5. Between the pair of the adjacent filter plates 1, a shorter horizontal rod 6 is hung from and between the coiled spring 4 of one support arm 2 disposed at one side face of one filter plate 1 and the coiled spring 4 of the other support arm 2 disposed at the other side face of the one filter plate 1. A longer horizontal rod 6 is hung from and between the coiled spring 4 of one support arms 2 disposed at one side face of the other filter plate 1 and the coiled spring 4 of the other support arm 2 disposed at the other side face of the other filter plate 1.

When the filter plates 1 are clamped to each other such that each of the support arms 2 stands vertically, one pair of the support arms 2 mounted on one of the filter plates 1 and another pair of the support arms 2 mounted on a neighboring one of the filter plates 1 are spaced a predetermined clearance from each other such that the longer horizontal rod 6 is projected out of the predetermined clearance. The longer horizontal rod 6 is disposed downwardly of the shorter horizontal rod 6 such that the longer and shorter horizontal rods 6 are positively held out of contact with each other at the time of clamping of the filter plates 1 to each other, etc. However, it is needless to say that no problem arises even if the longer and shorter horizontal rods 6 are disposed at an identical height. A pair of lugs 1b are provided on opposite side faces of each of the filter plates 1, respectively so as to be slidably placed on the side plates 7 such that the filter plates 1 are slid forwardly and rearwardly. A filter cloth 3 is attached, at opposite ends thereof, to the horizontal rods 6 confronting opposite filtration faces of each of the filter plates 1 so as to be brought into contact, at a central portion thereof, with a bottom face of each of the filter plates 1.

When one filtration cycle of the filter press has been completed, a pair of the adjacent filter plates 1 are retracted away from each other as shown in FIG. 2. Thus, a pair of the adjacent support arms 2 attached pivotally to the pair of the adjacent filter plates 1 are also retracted away from each other. Accordingly, a pair of the adjacent filter cloths 3 are pulled apart from the adjacent filter plates 1 by the coiled springs 4 of the pair of the adjacent support arms 2, respectively so as to be held in a strained state.

Subsequently, when a head portion 8 of a filter cloth vibrator is brought into contact with the horizontal rod 6 so as to vibrate the horizontal rod 6 as shown in imaginary lines in FIG. 3, the filter cloth 3 is slackened and strained on its surface alternately and thus, filter residue adhering to the surface of the filter cloth 3 is separated from the filter cloth 3. When the pair of the adjacent support arms 2 are retracted away from each other when the pair of the adjacent filter plates are retracted away from each other, each of the filter cloths 3 extending over the adjacent filter plates 1 is hung, at one side of the opposite filtration faces of each of the adjacent filter plates 1, from each of the horizontal rods 6 attached to the adjacent support arms 2, respectively and then, is turned upwardly through its contact with the bottom face of each of the filter plates 1 so as to be hung from the horizontal rod 6 disposed at the other side of the opposite filtration faces of each of the adjacent filter plates 1. Consequently, a sufficient space enabling various operations is defined both between the confronting filter cloths 3 disposed between the pair of the adjacent filter plates 1 and upwardly of the confronting filter cloths 3.

As shown in FIGS. 4 and 5, the filter cloth 3 has a pair of rolled portions 3a stitched at opposite ends thereof, respectively. Meanwhile, as shown in FIG. 6, each of the rolled portions 3a can also be formed by using an adhesive tape 9 made of cloth. Thus, the filter cloth 3 can be further formed by two portions split in a widthwise direction of the filter cloth 3, for example, two half portions such that the two half portions are detachably attached to each other by the adhesive tape. Thereby, the filter cloth fitting operation is remarkably simplified.

As is clear from the foregoing description, in the filter cloth hanging apparatus of the present invention, a sufficient clearance can be secured between the confronting filter cloths strained between the pair of the adjacent filter plates and a large upper space can be obtained between the confronting filter cloths when the filter plates are retracted away from each other. Accordingly, various operations can be easily performed between the confronting filter cloths and the washing nozzle can be provided from above the adjacent filter plates positively.

Meanwhile, in accordance with the present invention, since the filter cloth is hung from the pair of the support arms through the respective springs, an unused portion of the filter cloth is reduced. If the pair of the horizontal rods having the filter cloth hanging therefrom are so downwardly disposed as to come close to the top face of the filter plate, the clearance between the confronting filter cloths or a distance between the confronting horizontal rods can be further increased.

Furthermore, in accordance with the present invention, the filter cloth fitting operation can be performed easily. If the filter cloth is formed by two portions attached detachably to each other with the adhesive tape made of cloth, only a damaged one of the two portions is required to be replaced by a new one. Since each of the rolled portions disposed at the opposite ends of the filter cloth is formed by using the adhesive tape made of cloth the overall length of the filter cloth can be adjusted easily by the rolled portions.

Moreover, in accordance with the present invention, since vibrations of the filter cloth vibrator can be transmitted directly to the filter cloth, it becomes possible to efficiently separate from the filter cloth filter residue adhering thereto.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. A filter cloth hanging apparatus for a filter press comprising:
    a plurality of adjacent filter plates comprised of first and second opposed filtration faces and a first edge face, a second edge face and a bottom face provided between said filtration faces;
    each filter plate of said plurality of adjacent filter plates having a first and second support arm member each pivotally attached at their respective first ends to said first edge face, and a first and second support arm member each pivotally attached at their respective first ends to said second edge face;
    each pair of adjacent filter plates having said first support arm members of said first and second edge faces of one of said pair of adjacent filter plates attached at their second ends to the respective second ends of said second support arm members of said first and second edge faces of the other of said pair of adjacent filter plates;
    a spring means attached to each of said support arm members intermediate said first and second ends;
    a set of first and second horizontal rods associated with each filter plate, said first horizontal rod hung from and extending between said spring means attached to said first support arm member attached to said first edge face and said spring means attached to said first support arm member attached to said second edge face, said second horizontal rod hung from and extending between said spring means attached to said second support arm member attached to said first edge face and said spring means attached to said second support member attached to said second edge face;
    a filter cloth associated with each filter plate having one end attached to said first horizontal rod, extending over said first filtration face and around and in contact with said bottom face, over said second filtration face and having its other end attached to said second horizontal rod, whereby said spring means associated with said first and second horizontal rods exert tension on said filter cloth in a direction to force said filter cloth against said bottom face.

2. A filter cloth hanging apparatus as claimed in claim 1,
    wherein said filter cloths are comprised of two portions and a cloth adhesive tape for detachably attaching said two portions along the width of said filter cloth in order that either of said portions may be replaced.

3. A filter cloth hanging apparatus as claimed in claim 2,
    wherein said two portions of said filter cloth each comprise one half of said filter cloth.

* * * * *